(12) United States Patent
Ushiro et al.

(10) Patent No.: US 11,474,765 B2
(45) Date of Patent: Oct. 18, 2022

(54) INFORMATION PROCESSING APPARATUS, INFORMATION PROCESSING SYSTEM, AND NON-TRANSITORY COMPUTER READABLE MEDIUM

(71) Applicant: FUJIFILM BUSINESS INNOVATION CORP., Tokyo (JP)

(72) Inventors: Takemichi Ushiro, Kanagawa (JP); Takashi Kojima, Kanagawa (JP); Katsuhito Habaguchi, Kanagawa (JP); Masahiko Yajima, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/865,501

(22) Filed: May 4, 2020

(65) Prior Publication Data

US 2021/0191667 A1 Jun. 24, 2021

(30) Foreign Application Priority Data

Dec. 20, 2019 (JP) .............................. JP2019-230810

(51) Int. Cl.
*G06F 3/12* (2006.01)
*G06K 15/02* (2006.01)

(52) U.S. Cl.
CPC ............ *G06F 3/126* (2013.01); *G06F 3/1203* (2013.01)

(58) Field of Classification Search
None
See application file for complete search history.

(56) References Cited

U.S. PATENT DOCUMENTS

| | | | | |
|---|---|---|---|---|
| 6,513,073 B1* | 1/2003 | Kawai | ............... | G06F 3/1288 710/1 |
| 8,259,335 B2* | 9/2012 | Lankreijer | ............. | G06F 3/1285 358/1.15 |
| 8,743,393 B2* | 6/2014 | Hirasawa | ............... | G06F 3/1285 358/1.15 |
| 9,197,765 B2 | 11/2015 | Kuroshima | | |
| 2003/0208564 A1* | 11/2003 | Miyake | ............... | G06F 16/50 709/219 |
| 2005/0105129 A1* | 5/2005 | Takahashi | ............. | H04N 1/00432 358/1.15 |
| 2005/0267797 A1* | 12/2005 | Takahashi | ............. | G06F 3/1229 718/102 |

(Continued)

FOREIGN PATENT DOCUMENTS

| | | | | |
|---|---|---|---|---|
| JP | 2005222344 | * | 8/2005 | ............. G06F 17/60 |
| JP | 2010-128568 A | | 6/2010 | |
| JP | 5574821 B2 | | 8/2014 | |

*Primary Examiner* — Beniyam Menberu
(74) *Attorney, Agent, or Firm* — Oliff PLC (57) ABSTRACT

An information processing apparatus includes a processor configured to: acquire work instruction information stored in a specific folder and target information that is a target of image formation and that corresponds to the work instruction information; change an order of the acquired work instruction information such that the target information corresponding to the work instruction information are subjected to the image formation in a predetermined order; and perform a process of sequentially storing the work instruction information the order of which is changed in a target folder from which an image forming apparatus takes information that is the target of the image formation.

16 Claims, 9 Drawing Sheets

(56) References Cited

U.S. PATENT DOCUMENTS

| | | | |
|---|---|---|---|
| 2006/0279780 A1* | 12/2006 | Anno | G06F 3/1285 |
| | | | 358/1.15 |
| 2010/0097647 A1* | 4/2010 | Sakurai | G06F 3/127 |
| | | | 358/1.15 |
| 2010/0149565 A1* | 6/2010 | Mori | G06F 3/1275 |
| | | | 358/1.9 |
| 2010/0225963 A1* | 9/2010 | Kuroshima | G06F 3/1253 |
| | | | 358/1.15 |
| 2011/0128584 A1* | 6/2011 | Kuroshima | G06F 3/127 |
| | | | 358/1.15 |
| 2011/0258540 A1* | 10/2011 | Ueda | G06F 16/168 |
| | | | 715/273 |
| 2011/0286041 A1* | 11/2011 | Kuroshima | G06F 3/127 |
| | | | 358/1.15 |
| 2014/0362419 A1* | 12/2014 | Kamens | H04N 1/2187 |
| | | | 358/407 |
| 2018/0285031 A1* | 10/2018 | Dalvi | G06F 3/1206 |
| 2020/0042260 A1* | 2/2020 | Kanamoto | G06F 3/1253 |

* cited by examiner

INFORMATION PROCESSING APPARATUS, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-230810 filed Dec. 20, 2019.

BACKGROUND

1. Technical Field

The present invention relates to an information processing apparatus, an information processing system, and a non-transitory computer readable medium.

2. Related Art

Japanese Patent No. 5574821 discloses a management apparatus that receives file information of a file input into a folder from an outside, generates print job information including the file information, and transmits the print job information to an image forming apparatus associated with the folder in advance. Specifically, the management apparatus monitors whether the image forming apparatus is in a printable state based on state information of the image forming apparatus, and when it is determined that the image forming apparatus is in a state where printing cannot be performed, an authority to refuse input of the file into the folder is set to the folder. Then, and when it is determined that the image forming apparatus is in the printable state after the authority to refuse the input of the file into the folder is set, an authority to permit input of the file into the folder is set to the folder.

Further, JP-A-2010-128568 discloses a printing system including a job management system that includes a detector configured to detect file input into a specific folder, a transfer configured to transfer a copy of the file detected by the detector to an image forming apparatus, and a monitoring unit configured to monitor a processing status of the transferred file, in which when it is detected that printing of the file transferred to the image forming apparatus is completed, the file input into the folder is deleted.

SUMMARY

A technique is known that stores work instruction information in a specific folder, so that an image forming apparatus forms an image in accordance with content described in work instruction information. However, when plural pieces of work instruction information are stored in the specific folder, the image forming apparatus may not be able to control an order in which images of the work instruction information stored in the specific folder are formed. Then, aspects of non-limiting embodiments of the present disclosure relate to providing an information processing apparatus, an information processing system, and a non-transitory computer readable medium that can control the order in which the images are formed even when the plural pieces of work instruction information are stored in the specific folder.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: acquire work instruction information stored in a specific folder and target information that is a target of image formation and that corresponds to the work instruction information; change an order of the acquired work instruction information such that the target information corresponding to the work instruction information are subjected to the image formation in a predetermined order; and perform a process of sequentially storing the work instruction information the order of which is changed in a target folder from which an image forming apparatus takes information that is the target of the image formation.

BRIEF DESCRIPTION OF THE DRAWINGS

Exemplary embodiment (s) of the present disclosure will be described in detail based on the following figures, wherein.

DETAILED DESCRIPTION

Figure 1:
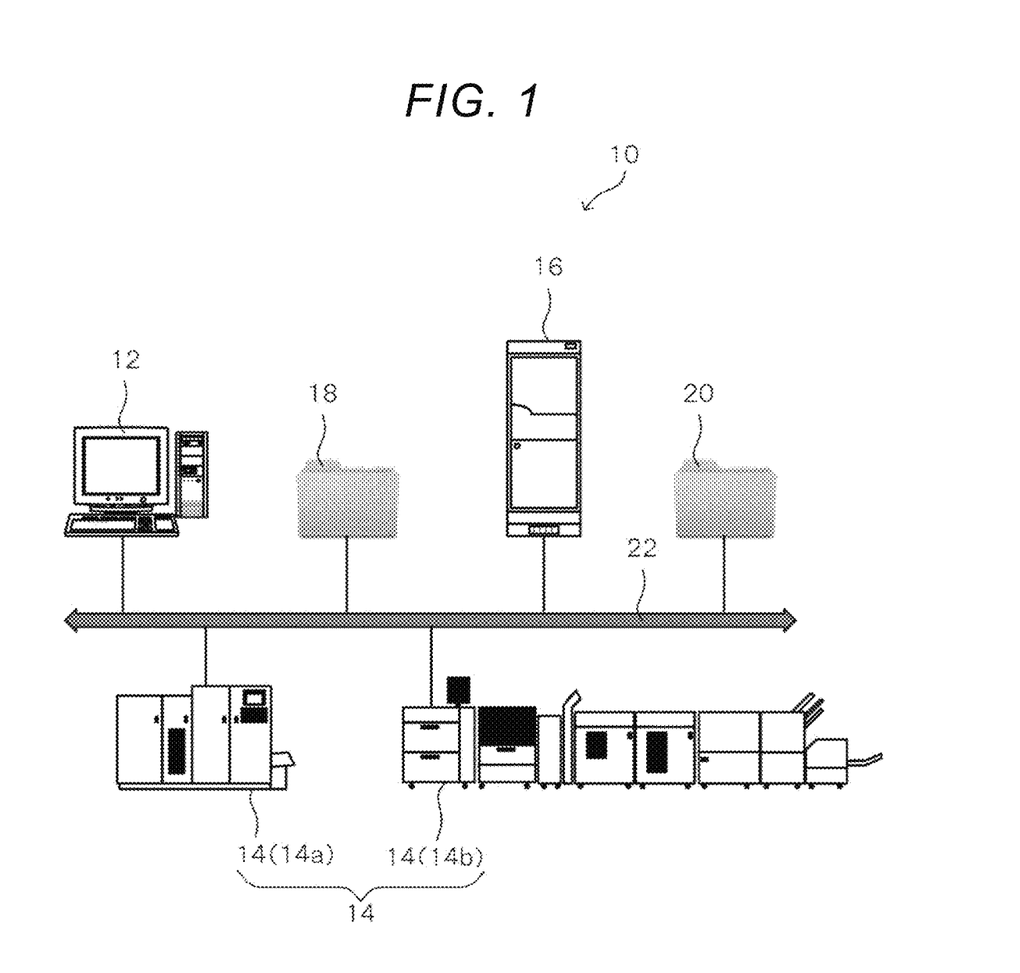
FIG. 1 is a diagram showing a schematic configuration of a print processing system according to an exemplary embodiment.

Hereinafter, an example of a present exemplary embodiment will be described in detail with reference to the drawings. In the present exemplary embodiment, description will be made on a print processing system that stores a job definition format (JDF) as work instruction information in a hot folder for printing, as an example of an information processing system. FIG. 1 is a diagram showing a schematic configuration of the print processing system according to the present exemplary embodiment.

The term "JDF" refers to a specification of an industry-standard document format designed to share information between manufacturing processes of a printed matter or a specification of a data exchange format between the manufacturing process models. The JDF is issued by an international standardization group "CIP4" for integrating and managing processes of pre-press, press, and post-press. The JDF includes items of basic specifications, such as a customer name, the number of pages, a size, a delivery date, items of a specification and work performance in each manufacturing process, and items such as a delivery destination of a product. Thus, the JDF allows a description in which an entire production process of a printing work can be managed. For example, the JDF enables paperless processing by eliminating issuance of paper work instructions, giving a direct work instruction to JDF supporting equipment, managing work progress, automating work and setting, and the like.

Further, the term "hot folder" refers to a folder for automatically printing various files such as a PDF file by storing a print target in the hot folder without performing troublesome print option setting by a printer driver. Specifically, the hot folder is a folder in which a print option with a high frequency of use and a queue used in imposition setting and printing can be set and stored.

A print processing system 10 according to the present exemplary embodiment is described as one targeting a production market that targets two markets, that is, a commercial printing market and a data printing market. It is noted that the print processing system 10 is not limited thereto.

As shown in FIG. 1, in the print processing system 10 according to the present exemplary embodiment, a print data generation system 12, a printer 14 (14a, 14b) (an example of an image forming apparatus), and a print server 16 (an example of an information processing apparatus) are connected to a communication line 22 such as a network. The two printers 14 are shown as an example. It is noted that the number of the printers 14 is not limited to two, and may be one or three or more.

A hot folder 18 (an example of a specific folder) provided corresponding to the print server 16 and a hot folder 20 (an example of a target folder) provided corresponding to each of the printers 14 are connected to the communication line 22. In FIG. 1, one hot folder 18 and one hot folder 20 are shown, but plural hot folders 18, 20 are provided for each printer 14. A correspondence relationship between the hot folders 18, 20 and the printers 14 may be in any of the followings. That is, the hot folders 18, 20 are provided for each printer 14. Or, information for specifying a printer is added to attributes of JDFs stored in the hot folders 18, 20, and a printer for printing is selected. The hot folder 18 may be provided in a storage area in the print server 16. Alternatively, the hot folder 18 may be provided in a server dedicated for the hot folder 18. The hot folder 20 may be provided in a storage area in each of the printers 14. Alternatively, the hot folder 20 may be provided in a server dedicated for the hot folder 20. The JDF and a content file to be printed may be stored together in the hot folders 18, 20. Alternatively, the JDF may be stored in the hot folders 18, 20 and the content file to be printed may be stored in another folder specified by the JDF.

The print data generation system 12 generates a JDF and a content file for printing a print target such as a core output form.

The printer 14 acquires the content file to be printed from content of the JDF stored in the hot folder 20, and performs printing by forming an image on a sheet according to content set in the hot folder 20 and the content of the JDF.

The print server 16 performs a process of taking the JDFs stored in the hot folder 18 and rearranging the JDFs to change an order of the JDFs such that printing is performed in a predetermined order, and performs a process of storing the rearranged JDFs in the hot folder 20.

Figure 2:
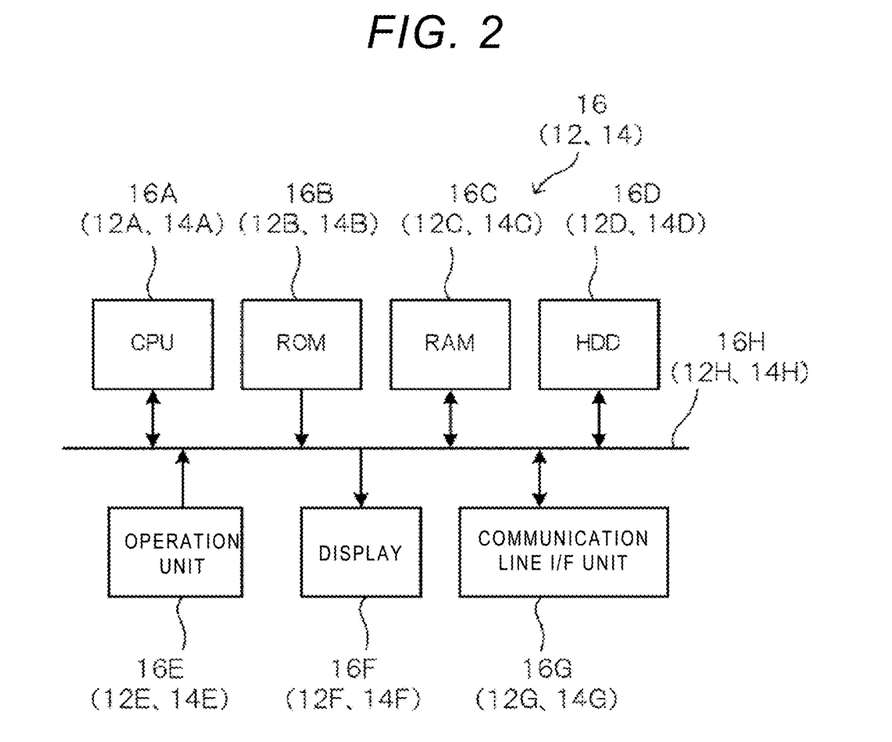
FIG. 2 is a block diagram showing configurations of a print data generation system, a printer, and a print server in the print processing system according to the present exemplary embodiment.

Next, configurations of the print data generation system 12, the printer 14, and the print server 16 in the print processing system 10 according to the present exemplary embodiment will be described. FIG. 2 is a block diagram showing the configurations of the print data generation system 12, the printer 14, and the print server 16 in the print processing system 10 according to the present exemplary embodiment. The print data generation system 12, the printer 14, and the print server 16 basically have a general-purpose computer configuration. Thus, the print server 16 will be described as a representative.

As shown in FIG. 2, the print server 16 according to the present exemplary embodiment includes a CPU 16A (an example of a processor), a ROM 16B, a RAM 16C, an HDD 16D, an operation unit 16E, a display 16F, and a communication line interface (I/F) unit 16G. The CPU 16A controls an overall operation of the print server 16. The ROM 16B stores various control programs and various parameters in advance. The RAM 16C is used as a work area when the CPU 16A executes the various programs. The HDD 16D stores various data, application programs, and the like. The operation unit 16E is used to input various information. The display 16F is used to display the various information. The communication line I/F unit 16G is connected to the communication line 22, and transmits and receives various data to and from other apparatuses connected to the communication line 22. The above-described components of the print server 16 are electrically connected to each other via a system bus 16H. In the print server 16 according to the present exemplary embodiment, the HDD 16D is used as a storage. It is noted that the present disclosure is not limited thereto. Another nonvolatile storage such as a flash memory may be used.

With the above-described configuration, the print server 16 according to the present exemplary embodiment executes the followings by the CPU 16A, that is, access to the ROM 16B, the RAM 16C, and the HDD 16D, input various data via the operation unit 16E, and display various information on the display 16F. The print server 16 also controls, by the CPU 16A, transmission and reception of communication data via the communication line I/F unit 16G.

In the print processing system 10 according to the present exemplary embodiment configured in this way, when JDFs generated by the print data generation system 12 are stored in the hot folder 18, the print server 16 performs a process of rearranging the JDFs such that the JDFs are arranged in a predetermined order and storing the rearranged JDFs in the hot folder 20.

Figure 3:
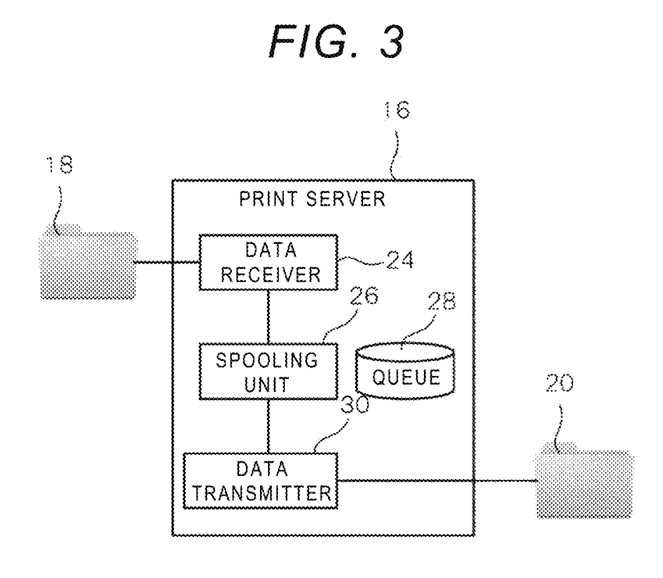
FIG. 3 is a functional block diagram showing a functional configuration of the print server according to the present exemplary embodiment.
Figure 4:
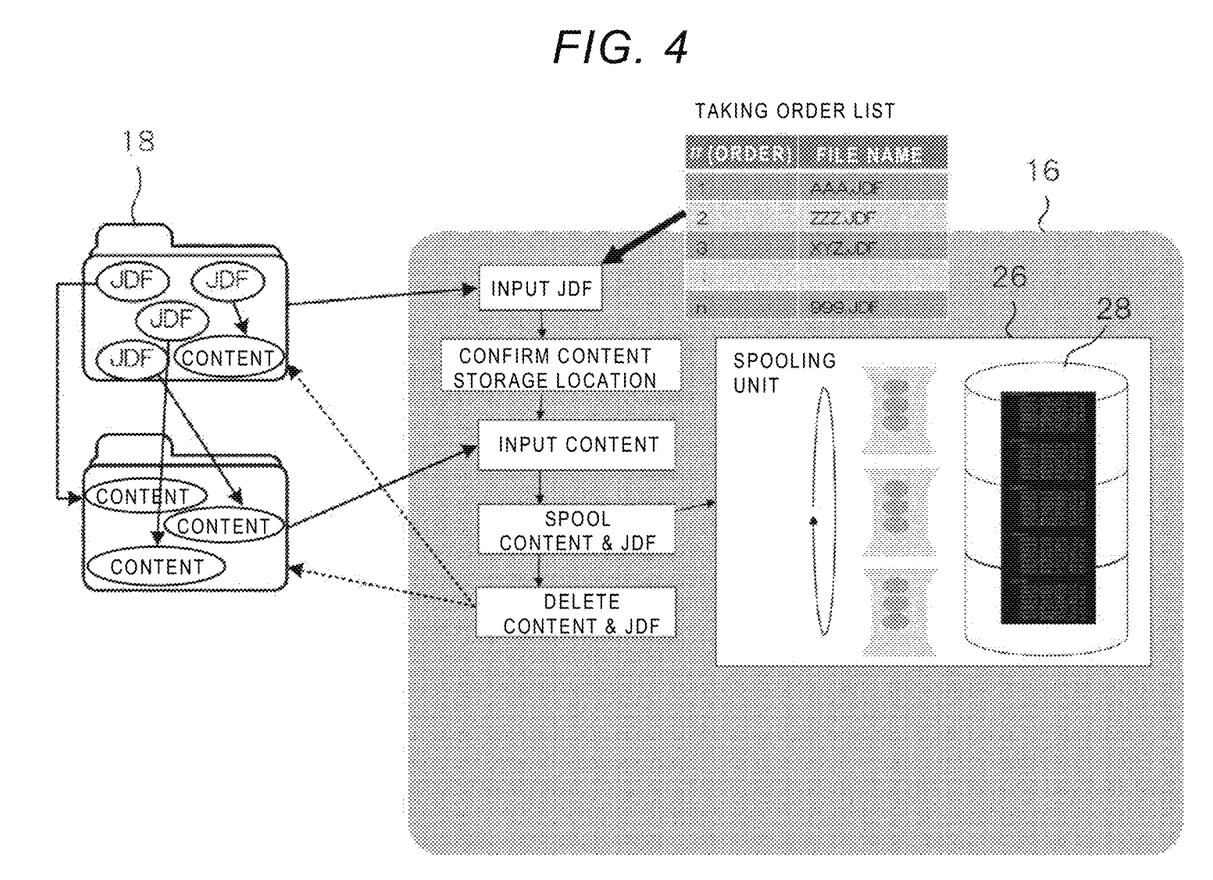
FIG. 4 is a diagram showing functions of the print server according to the present exemplary embodiment at a time of receiving data.
Figure 6:
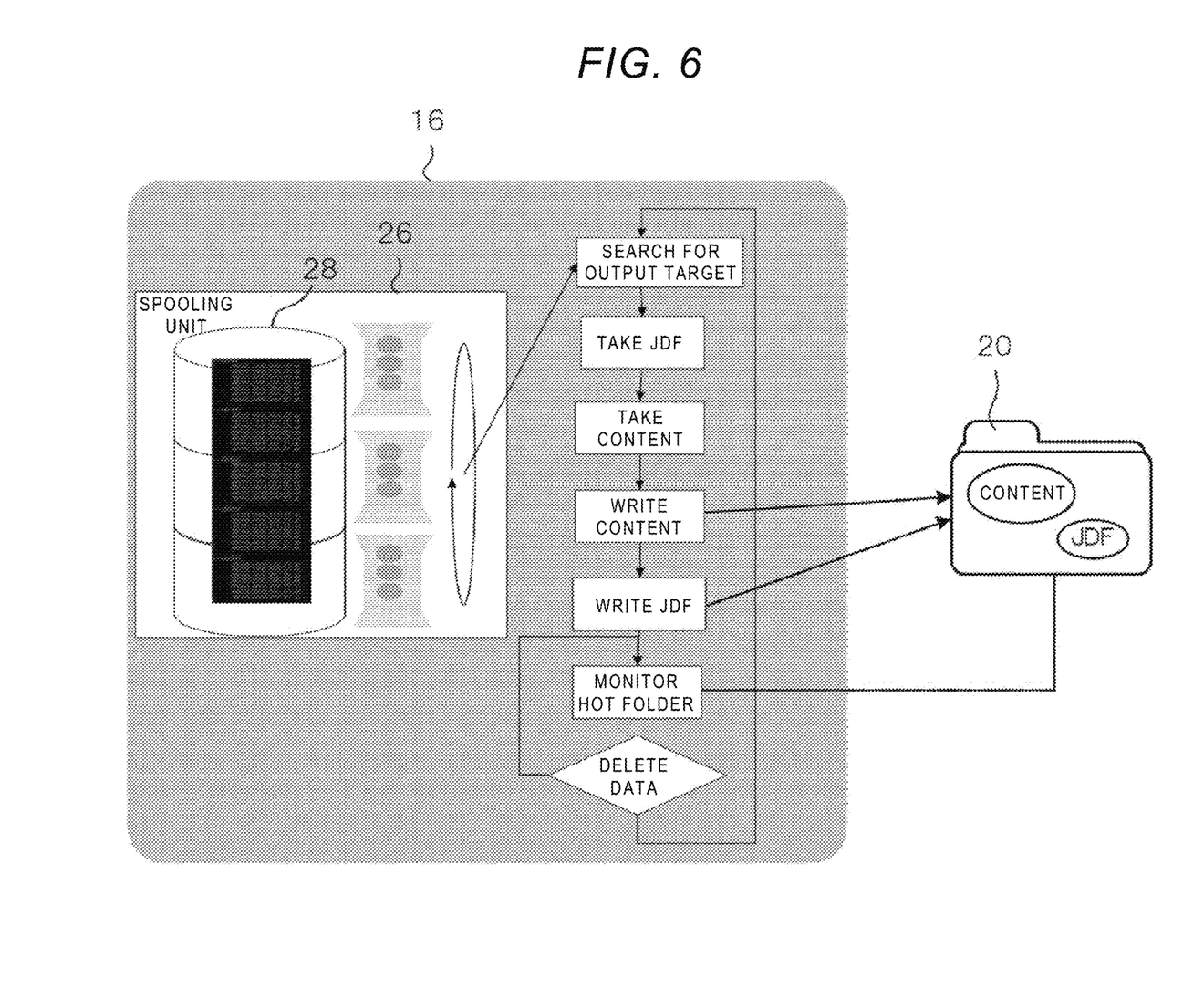
FIG. 6 is a diagram showing functions of the print server according to the present exemplary embodiment at a time of transmitting data.

Next, a functional configuration of the print server 16 according to the present exemplary embodiment will be described. FIG. 3 is a functional block diagram showing the functional configuration of the print server 16 according to the present exemplary embodiment. FIG. 4 is a diagram showing functions of the print server 16 according to the present exemplary embodiment at a time of receiving data. FIG. 6 is a diagram showing functions of the print server 16 according to the present exemplary embodiment at a time of transmitting data.

As shown in FIG. 3, the print server 16 has functions of a data receiver 24, a spooling unit 26, and a data transmitter 30.

The data receiver 24 acquires the JDF stored in the hot folder 18 and the content file specified by the JDF. That is, as shown in FIG. 4, the JDF stored in the hot folder 18 is input to the print server 16 ("input JDF" in FIG. 4), a content storage location is confirmed based on the JDF, and the corresponding content file is input ("input content" in FIG. 4).

Figure 5:
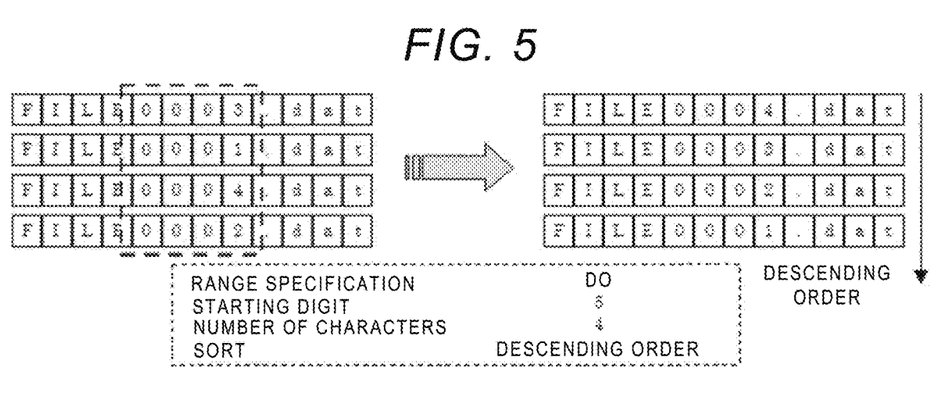
FIG. 5 is a diagram showing an example of changing an order of JDFs by a spooling unit.

The spooling unit 26 rearranges the JDFs acquired by the data receiver 24 such that printing is performed in the predetermined order, and spools the JDFs and the content files corresponding to the JDFs in a queue 28 ("spool content & JDFs" in FIG. 4). Then, the spooling unit 26 deletes the input JDFs and the content files from the hot folder 18 and the folder in which the content files are stored ("delete content & JDFs" in FIG. 4). As shown in FIG. 5, the predetermined order when the spooling unit 26 rearranges the JDFs is rearranged, for example, in order of time stamp or in order of file name. When the JDFs are rearranged in order of the time stamp, files in a search directory are sorted in ascending order of a time stamp (file creation date and time of the JDF), that is, from the earliest time stamp to the latest time stamp, and are acquired in order from the earliest one. Meanwhile, when the JDFs are rearranged in order of a file name, all or a part of the file names are used as sort information to sort the files in ascending order or descending order specified in advance, and are acquired in order from the top. FIG. 5 shows an example in which a range is specified such that a starting digit is the fifth digit and the number of characters is 4, and the files are sorted in descending order. For example, a user may be allowed to select whether to change to the time stamp order or the file name order, by changing the settings of the print server 16.

As shown in FIG. 6, the data transmitter 30 searches for the JDF and the content file which are output targets and which are spooled in the queue 28 by the spooling unit 26, takes the JDFs, and takes the content files. Then, the data transmitter 30 performs a process of writing the taken JDFs and the taken content files to the hot folder 20. In the present exemplary embodiment, a first in first out (FIFO) mode and a non-FIFO mode are provided. When the FIFO mode is set in advance, the data transmitter 30 monitors whether a JDF and a content file stored in the hot folder 20 are processed and deleted by the printer 14, and when the JDF and the content file are deleted, sequentially performs a process of storing a next JDF and a next content file in the hot folder 20. Accordingly, even when the plural JDFs are stored in the hot folder 18, the print process order is controlled by the print server 16.

Figure 7:
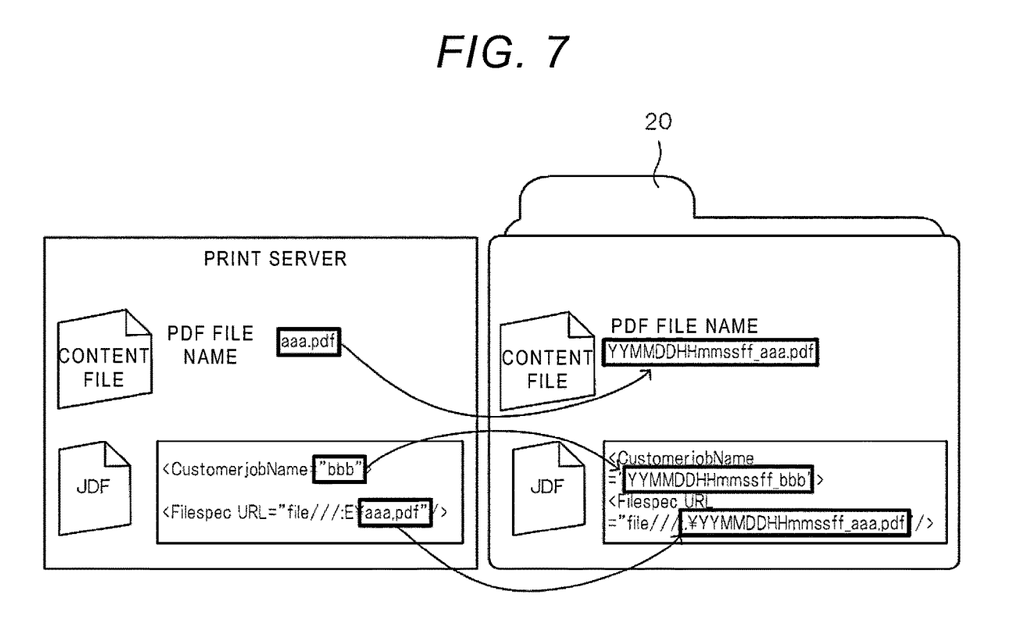
FIG. 7 is a diagram showing an example of changing file names to unique file names.

When taking a JDF and a content file from the queue 28 and stores the JDF and the content file in the hot folder 20, the data transmitter 30 performs a process of changing file names to unique file names, so that overwriting due to accidental storage of a file having the same file name from another system or the like is prohibited. Therefore, the data transmitter 30 changes the file names using a date and time of a timing at which the JDF is taken from the queue 28. For example, as shown in FIG. 7, year, month, day, hour, minute, second, millisecond and "_" are added as a prefix of the file name of the JDF. Further, year, month, day, hour, minute, second, millisecond, and "_" are added as a prefix of a file name of the content file that is referenced based on the JDF. Further, year, month, day, hour, minute, second, millisecond, and "_" are added as a prefix of a file name of the content file specified in the JDF. Herein, a case where the prefix is added based on time information of the timing at which the JDF is taken is described. It is noted that the present invention is not limited thereto. For example, the prefix may be added using time information on a timing at which the JDF is stored. Alternatively, the prefix may be added using a combination of (i) identification information such as user identification information on a user who stores the JDF or an identifier of a computer of a transmission source, and (ii) a serial number. Any information that can uniquely specify the JDF or the content file can be used as the prefix.

Figure 8:
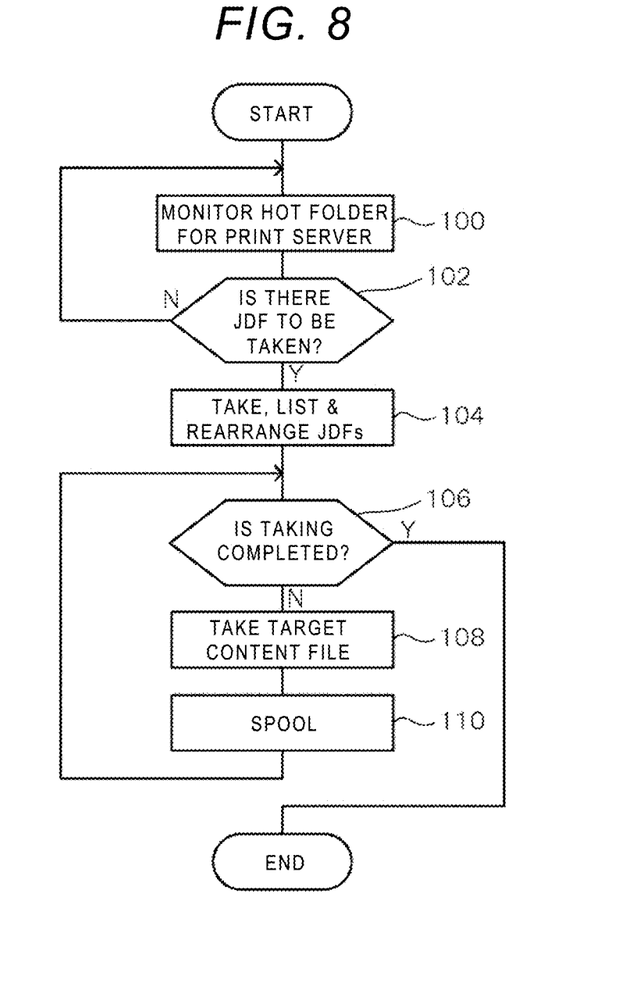
FIG. 8 is a flowchart of an exemplary process at the time of receiving data when the print server according to the present exemplary embodiment inputs the JDF and a corresponding content file from a hot folder.

Next, a specific process performed by the print server 16 according to the present exemplary embodiment configured as described above will be described. First, a process at the time of receiving data when JDFs and corresponding content files are input from the hot folder 18 to the print server 16 will be described. FIG. 8 is a flowchart of an exemplary process at the time of receiving data when the print server 16 according to the present exemplary embodiment inputs the JDF and the corresponding content file from the hot folder 18.

In step 100, the CPU 16A monitors the hot folder 18 for the print server 16, and proceeds to step 102.

In step 102, the CPU 16A determines whether JDFs to be taken are in the hot folder 18. When the determination result is negative, the CPU 16A returns to step 100 to repeat the above-described process. When the determination result is affirmative, the CPU 16A proceeds to step 104. That is, the data receiver 24 monitors whether the JDFs are stored in the hot folder 18.

In step 104, the CPU 16A takes and lists the JDFs, rearranges the JDFs in the predetermined order, and proceeds to step 106. That is, the data receiver 24 takes the JDFs stored in the hot folder 18, and the spooling unit 26 rearranges the JDFs acquired by the data receiver 24 such that printing is performed in the predetermined order.

In step 106, the CPU 16A determines whether it is completed to take the JDFs from the hot folder 18. When the determination result is negative, the CPU 16A proceeds to step 108. When the determination result is affirmative, a series of processes ends.

In step 108, the CPU 16A takes a target content file, and proceeds to step 110. That is, the spooling unit 26 takes the content file corresponding to the JDF from a storage location specified by the JDF.

In step 110, the CPU 16A spools the JDF and the corresponding content file in the queue 28, and then returns to step 106 and repeats the above-described process until it is completed to take the JDFs from the hot folder 18. That is, the spooling unit 26 spools the JDFs rearranged in the predetermined order and the content files corresponding to the JDFs in the queue 28.

Figure 9:
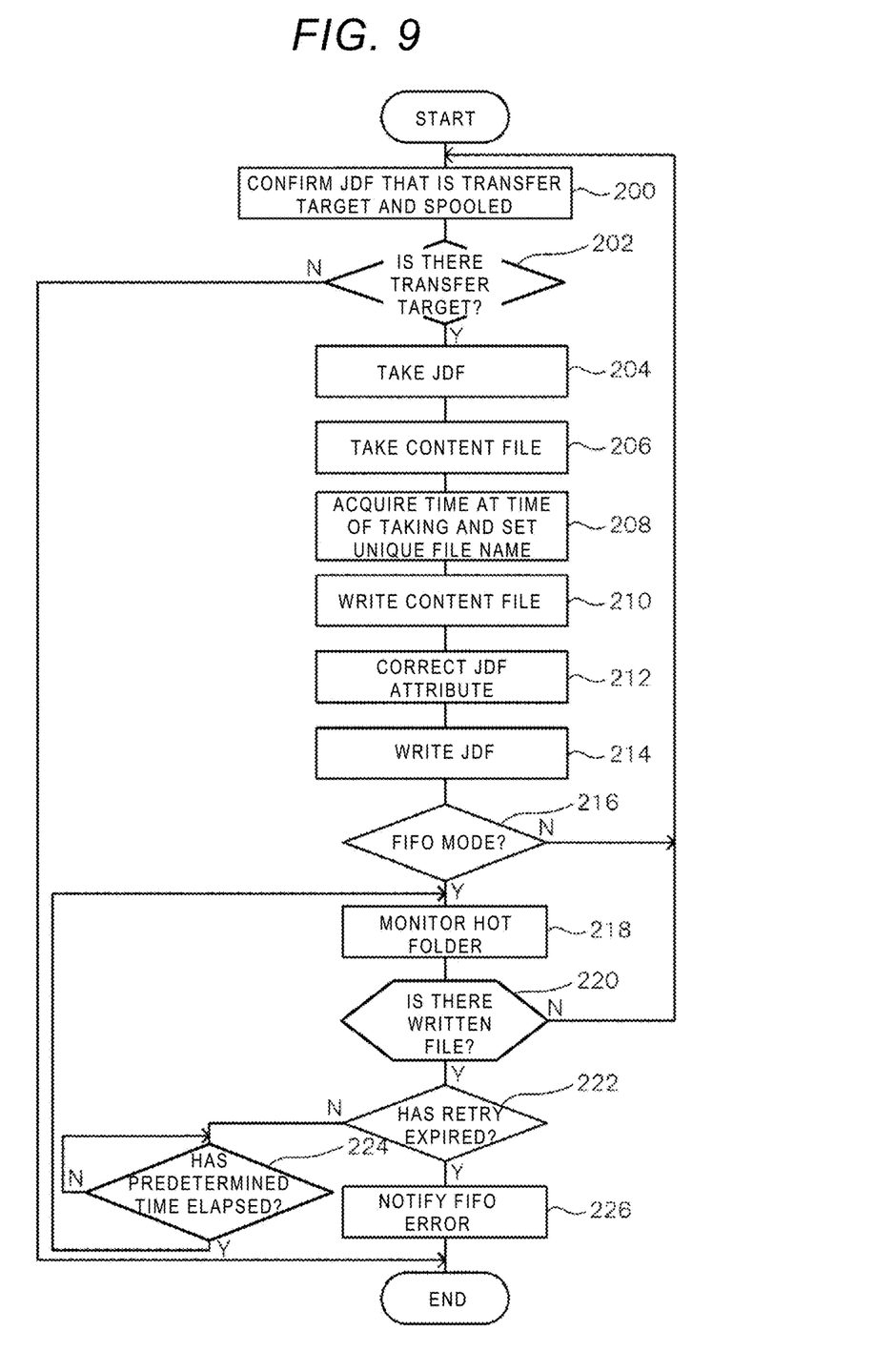
FIG. 9 is a flowchart of an exemplary process at the time of transmitting data when the print server according to the present exemplary embodiment stores the JDF and the corresponding content file in the hot folder.

Next, a process at the time of transmitting data when the print server 16 stores a JDF and a corresponding content file in the hot folder 20 will be described. FIG. 9 is a flowchart of an exemplary process at the time of data transmission when the print server 16 according to the present exemplary embodiment stores the JDF and the corresponding content file in the hot folder 20.

In step 200, the CPU 16A confirms the JDF which is a transfer target and which is spooled in the queue 28, and proceeds to step 202. That is, the data transmitter 30 searches for the JDF and the content file which are output targets and which are spooled in the queue 28 by the spooling unit 26.

In step 202, the CPU 16A determines whether there is a transfer target. When the determination result is affirmative, the CPU 16A proceeds to step 204. When the determination result is negative, a series of processes ends.

In step 204, the CPU 16A takes the JDF from the queue 28, and proceeds to step 206. That is, the data transmitter 30 takes the JDF which is the output target and which is spooled in the queue 28 by the spooling unit 26.

In step 206, the CPU 16A takes the content file corresponding to the JDF from the queue 28, and proceeds to step 208. That is, the data transmitter 30 takes the content file which is the output target and which is spooled in the queue 28 by the spooling unit 26.

In step 208, the CPU 16A acquires a time at the time of taking the JDF and sets a unique file name, and proceeds to step 210. In the present exemplary embodiment, the data transmitter 30 sets the file name of the content file using a date and time of a timing at which the JDF is taken from the queue 28. For example, the data transmitter 30 adds year, month, day, hour, minute, second, millisecond and "_" as the prefix of the file name of the JDF, and adds year, month, day, hour, minute, second, millisecond and "_" as the prefix of the file name of the content file which is referenced based on the JDF. In the present exemplary embodiment, the data transmitter 30 sets the file name of the content file using the date and time of the timing at which the JDF is taken from the queue 28. Alternatively, the data transmitter 30 may set the file name using information other than the date and time such that the file name is the unique file name.

In step 210, the CPU 16A writes the content file to the hot folder 20, and proceeds to step 212. That is, the data transmitter 30 performs a process of writing the content file whose file name is changed to the hot folder 20.

In step 212, the CPU 16A corrects an attribute of the JDF according to the file name of the content file, and proceeds to step 214. For example, the data transmitter 30 adds year, month, day, hour, minute, second, millisecond and "_" as the prefix of the file name of the content file specified in the JDF.

In step 214, the CPU 16A writes the JDF to the hot folder 20, and proceeds to step 216. That is, the data transmitter 30 performs a process of writing the JDF whose file attribute is corrected to the hot folder 20.

In step 216, the CPU 16A determines whether the mode is the FIFO mode. In this determination, the CPU 16A determines whether the FIFO mode is set in advance in the print server 16 by the user. When the determination result is negative, the CPU 16A returns to step 200 to repeat the above-described process. When the determination result is affirmative, the CPU 16A proceeds to step 218.

In step 218, the CPU 16A monitors the hot folder 20, and proceeds to step 220.

In step 220, the CPU 16A determines whether there is a file written in the hot folder 20. In this determination, the CPU 16A determines whether a file written in the hot folder 20 still remains without printed. When the determination result is negative, the CPU 16A returns to step 200 to repeat the above-described process. When the determination result is affirmative, the CPU 16A proceeds to step 222.

Herein, in the above-described exemplary embodiment, the CPU 16A of the print server determines whether a print command based on the JDF is taken into the printer 14 by determining whether the written file remains in the hot folder 20. Alternatively another method may be used. For example, it is also possible to determine whether the JDF is taken into the printer 14 based on a processing state of the printer 14. That is, for example, the print server 16 may determine whether the JDF is taken into the printer 14 by determining whether the print command based on the JDF is already stored in the storage location of the print command of the printer 14, or by acquiring the processing status of the print command from the printer 14 and grasping a start, an end, and a state of processing of the print command based on the JDF. In order to grasp the state of the printer 14, the print server 16 may acquire a status using a standard protocol such as a simple network management protocol (SNMP) or a line printer daemon protocol (LPR). Alternatively, setting for a notification may be described in a file such as a JDF, and the printer 14 may be set such that when printing reaches a predetermined state, the printer make a notification to the print server 16. In this case, the printer server 16 determines that the JDF is taken into the printer 14, in response to the notification from the printer 14.

In step 222, the CPU 16A determines whether a retry has expired. In this determination, for example, the CPU 16A determines whether the process of step 220 is performed the predetermined number of retries. Alternatively, the CPU 16A determines whether a predetermined retry time has elapsed. When the determination result is negative, the CPU 16A proceeds to step 224. When the determination result is affirmative, the CPU 16A proceeds to step 226.

In step 224, the CPU 16A determines whether the predetermined time has elapsed. The CPU 16A waits until the determination is affirmative, and returns to step 218 to repeat the above-described processes. That is, the CPU 16A retries to determine whether the written file is deleted after waiting for a certain time.

On the other hand, in step 226, the CPU 16A notifies the printer 14 of a FIFO error, and ends the series of processes. Accordingly, the FIFO error is displayed on the printer 14, and the user is notified of the FIFO error.

By performing the process in this way, the JDFs are stored in the hot folder 18 for the print server 16, and the print server 16 rearranges the JDFs such that printing is performed in the predetermined order, and stores the JDFs in the hot folder 20 for the printer 14. Accordingly, the order of printing is guaranteed by the print server 16.

For example, in the related art, even if the JDFs are stored in the hot folder in order, when sizes of the corresponding content files are different, the order in which the content files are ready to be printed in the printer 14 may change from the order of the JDFs. In the present exemplary embodiment, when the print server 16 operates in the FIFO mode, the order of the JDFs is guaranteed such that printing is performed in the predetermined order, and therefore printing is performed in an expected order.

In the above-described exemplary embodiment, an example in which the print server 16 has the non-FIFO mode and the FIFO mode is described. It is noted that the present disclosure is not limited thereto. The print server 16 may only have the FIFO mode. Alternatively, the print server 16 may have at least one of the non-FIFO mode, the FIFO mode, or a last-in-first-out (LIFO) mode (or a first-in last out (FILO) mode). Further alternatively, the print server 16 may have at least two or more of the three modes and the user may be allowed to select a mode.

Further, in the above-described exemplary embodiment, the CPU has been described as an example of a processor. It is noted that the term "processor" refers to hardware in a broad sense. Examples of the processor includes general processors (e.g., CPU), dedicated processors (e.g., GPU: Graphics Processing Unit, ASIC: Application Specific Integrated Circuit, FPGA: Field Programmable Gate Array, and programmable logic device).

In the exemplary embodiment, operation of the processor may be implemented by one processor or by plural processors cooperating with each other that are located physically apart from each other. The order of the operations of the processor is not limited to the one described in the exemplary embodiment, but may be changed appropriately.

The process performed by the print server 16 in the print processing system 10 according to the above-described exemplary embodiment may be a process performed by software, a process performed by hardware, or a process performed by a combination of both. The process performed by the print server 16 and the like in the print processing system 10 may be stored as a program in a storage medium, and the program may be distributed.

It goes without saying that the present disclosure is not limited to the above. Various modifications can be made without departing from the gist of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
    a processor configured to:
        acquire a plurality of pieces of work instruction information stored in a specific folder and a plurality of pieces of target information, each piece of target information being a target of image formation and that corresponds to a piece of work instruction information;
        change an order of the acquired pieces of work instruction information such that the acquired pieces of target information corresponding to the acquired pieces of work instruction information are subjected to the image formation in a predetermined order, the predetermined order being based on a file creation date and time of the acquired pieces of work instruction information;
        store the acquired pieces of work instruction information in the predetermined order in a queue;
        perform a first process of sequentially, in the predetermined order, moving the pieces of work instruction information from the queue to a target folder from which an image forming apparatus takes the pieces of target information corresponding to the moved pieces of work instruction information; and
        determine whether a print command based on one of the moved pieces of work instruction information has been taken into the image forming apparatus based on detecting whether at least one of (i) the one of the moved pieces of work instruction information and (ii) a stored piece of target information corresponding to the one of the moved pieces of work instruction information remains in the target folder after the first process of sequentially moving the one of the moved pieces of work instruction information wherein
    the processor has a first-in-first-out mode and a non-first-in-first-out mode, and
    in response to the processor being in the first-in-first-out mode and one of (i) the processor having failed a predetermined number of times to confirm that the one of the pieces of moved work instruction information has been deleted from the target folder or (ii) a predetermined time having elapsed during which the processor has failed to confirm that the one of the pieces of moved work instruction information has been deleted from the target folder, the processor performs a second process of notifying the image forming apparatus of an error.

2. The information processing apparatus according to claim 1, wherein
    the first process is a process comprising
        in response to each occurrence of deletion from the target folder of the moved pieces of work instruction, sequentially moving a subsequent piece of work instruction information that is subsequent to the deleted piece of work instruction information in the predetermined order from the queue to the target folder.

3. The information processing apparatus according to claim 2, wherein
    the processor is configured to perform the first process in response to the processor being in the first-in-first-out mode.

4. An information processing system comprising:
    the information processing apparatus according to claim 3; and
    an image forming apparatus configured to
        take each piece of work instruction information from the target folder to perform a process of forming an image, and
        then delete, from the target folder, each piece of work instruction information for which the process of forming the image is completed.

5. An information processing system comprising:
    the information processing apparatus according to claim 2; and
    an image forming apparatus configured to
        take each piece of work instruction information from the target folder to perform a process of forming an image, and
        then delete, from the target folder, each piece of work instruction information for which the process of forming the image is completed.

6. The information processing apparatus according to claim 1, wherein
    the first process is a process comprising
        in response to each occurrence of taking from the target folder of the moved pieces of work instruction, sequentially moving a subsequent piece of work instruction information that is subsequent to the taken piece of work instruction information in the predetermined order from the queue to the target folder.

7. An information processing system comprising:
    the information processing apparatus according to claim 6; and
    an image forming apparatus configured to
        take each piece of work instruction information from the target folder to perform a process of forming an image, and
        then delete, from the target folder, each piece of work instruction information for which the process of forming the image is completed.

8. The information processing apparatus according to claim 1, wherein the specific folder is a folder provided for each of the image forming apparatuses.

9. An information processing system comprising:
    the information processing apparatus according to claim 8; and an image forming apparatus configured to
take each piece of work instruction information from the target folder to perform a process of forming an image, and
then delete, from the target folder, each piece of work instruction information for which the process of forming the image is completed.

10. The information processing apparatus according to claim 1, wherein the pieces of work instruction information indicate the image forming apparatus which performs the image formation as an attribute of the pieces of work instruction information.

11. An information processing system comprising:
the information processing apparatus according to claim 10; and
an image forming apparatus configured to
take each piece of work instruction information from the target folder to perform a process of forming an image, and
then delete, from the target folder, each piece of work instruction information for which the process of forming the image is completed.

12. The information processing apparatus according to claim 1, wherein the moving of the pieces of work instruction information to the target folder includes changing a file name of each piece of work instruction information to a unique file name and storing each piece of work instruction information in the target folder with the unique file name.

13. The information processing apparatus according to claim 12, wherein the processor changes the file name of each piece of work instruction information using time information.

14. An information processing system comprising:
the information processing apparatus according to claim 1; and
an image forming apparatus configured to
take each piece of work instruction information from the target folder to perform a process of forming an image, and
then delete, from the target folder, each piece of work instruction information for which the process of forming the image is completed.

15. A non-transitory computer readable medium storing a program that causes a computer to execute information processing, the information processing comprising:
acquiring a plurality of pieces of work instruction information stored in a specific folder and a plurality of pieces of target information, each piece of target information being a target of image formation and that corresponds to a piece of work instruction information;
changing an order of the acquired pieces of work instruction information such that the acquired pieces of target information corresponding to the acquired pieces of work instruction information are subjected to the image formation in a predetermined order, the predetermined order being based on a file creation date and time of the acquired pieces of work instruction information;
storing the acquired pieces of work instruction information in the predetermined order in a queue;
performing a first process of sequentially, in the predetermined order, moving the pieces of work instruction information from the queue to a target folder from which an image forming apparatus takes the pieces of target information corresponding to the moved pieces of work instruction information; and
determining whether a print command based on one of the moved pieces of work instruction information has been taken into the image forming apparatus based on detecting whether at least one of (i) the one of the moved pieces of work instruction information and (ii) a stored piece of target information corresponding to the one of the moved pieces of work instruction information remains in the target folder after the first process of sequentially moving the one of the moved pieces of work instruction information, wherein
the computer has a first-in-first-out mode and a non-first-in-first-out mode, and
the information processing further includes, in response to the computer being in the first-in-first-out mode and one of (i) the computer having failed a predetermined number of times to confirm that the one of the pieces of moved work instruction information has been deleted from the target folder or (ii) a predetermined time having elapsed during which the computer has failed to confirm that the one of the pieces of moved work instruction information has been deleted from the target folder, performing a second process of notifying the image forming apparatus of an error.

16. An information processing apparatus comprising:
means for acquiring a plurality of pieces of work instruction information stored in a specific folder and a plurality of pieces of target information, each piece of target information being a target of image formation and that corresponds to a piece of work instruction information;
means for changing an order of the acquired pieces of work instruction information such that the acquired pieces of target information corresponding to the acquired pieces of work instruction information are subjected to the image formation in a predetermined order, the predetermined order being based on a file creation date and time of the acquired pieces of work instruction information;
means for storing the acquired pieces of work instruction information in the predetermined order in a queue;
means for performing a first process of sequentially, in the predetermined order, moving the pieces of work instruction information from the queue to a target folder from which an image forming apparatus takes the pieces of target information corresponding to the moved pieces of work instruction information; and
means for determining whether a print command based on a moved piece of work instruction information has been taken into the image forming apparatus based on detecting whether at least one of (i) the one of the moved pieces of work instruction information and (ii) a stored piece of target information corresponding to the one of the moved pieces of work instruction information remains in the target folder after the first process of sequentially moving the one of the moved pieces of work instruction information, wherein
the means for performing has a first-in-first-out mode and a non-first-in-first-out mode, and
in response to the means for performing being in the first-in-first-out mode and one of (i) the means for determining having failed a predetermined number of times to confirm that the one of the pieces of moved work instruction information has been deleted from the target folder or (ii) a predetermined time having elapsed during which the means for determining has failed to confirm that the one of the pieces of moved work instruction information has been deleted from the target folder, the means for performing a second process of notifying the image forming apparatus of an error.

* * * * *